US006475462B1

United States Patent
Dodson et al.

(12) United States Patent
(10) Patent No.: US 6,475,462 B1
(45) Date of Patent: Nov. 5, 2002

(54) PROCESS AND APPARATUS FOR TREATING PARTICULATE MATTER

(75) Inventors: Christopher Edward Dodson, Oakville (CA); Grant Ashley Wellwood, Reading (GB)

(73) Assignee: Mortimer Technology Holdings Limited, Berkshire (GB)

( * ) Notice: Subject to any disclaimer, the term of this patent is extended or adjusted under 35 U.S.C. 154(b) by 0 days.

(21) Appl. No.: 09/508,671

(22) PCT Filed: Sep. 29, 1998

(86) PCT No.: PCT/GB98/02040

§ 371 (c)(1),
(2), (4) Date: Mar. 28, 2000

(87) PCT Pub. No.: WO99/16541

PCT Pub. Date: Apr. 8, 1999

(30) Foreign Application Priority Data

Sep. 30, 1997 (GB) .............................................. 9720810
Aug. 14, 1998 (GB) .............................................. 9817828

(51) Int. Cl.⁷ ................................................. B01J 8/18
(52) U.S. Cl. .......................... 423/659; 423/47; 423/89; 423/110; 423/153; 423/154; 423/DIG. 16; 422/145; 422/147
(58) Field of Search ........................ 423/659, DIG. 16, 423/47, 89, 110, 153, 154; 422/139, 145, 147

(56) References Cited

U.S. PATENT DOCUMENTS

| | | | |
|---|---|---|---|
| 3,104,155 A | 9/1963 | Warren | 23/1 |
| 4,479,920 A | 10/1984 | Dodson | 422/143 |
| 4,559,719 A | 12/1985 | Dodson | 34/10 |
| 5,114,700 A | 5/1992 | Meihack et al. | 423/571 |
| 5,290,529 A | 3/1994 | Baudequin | 423/337 |

FOREIGN PATENT DOCUMENTS

| | | | |
|---|---|---|---|
| CA | 674163 | * 11/1963 | .......... 423/DIG. 16 |
| GB | 2 247 307 A | 2/1992 | |
| WO | WO 92 02289 A | 2/1992 | |

OTHER PUBLICATIONS

Dr. Raymond E Vener "Moving Bed Processes" Reprinted from Chem. Eng. Jul. 1955, pp. 175–206.*
R J Priestly "Where Fluidized Solids Stand Today" Chem. Eng. Jul. 9, 1962 pp. 125–132.*

* cited by examiner

Primary Examiner—Stanley S. Silverman
Assistant Examiner—Timothy C Vanoy
(74) Attorney, Agent, or Firm—Bacon & Thomas

(57) ABSTRACT

The present invention provides a process for treating a particulate material, in which particles of the material to be treated interact with non-static particles of a second material, the process comprising the steps of: (i) providing a processing chamber (1) having an inlet (7) and an outlet (10) spaced downstream therefrom, the base (15) of said chamber comprising a plurality of outwardly radiating inclined vanes (20, 25), (ii) providing a host bed of particles (30) which include inert particles, alumina, limestone and activated carbon in the chamber (1) and generating a flow of fluid through the vanes (20, 25) at the base (15) of the processing chamber such that the bed of host particles (30) circulates about an axis of the chamber in a compact band, (iii) injecting particles of the material to be treated including sulphide ore, kaolin, gypsum and talc through an inlet (5) of the chamber (1) to contact with the circulating bed of the host particles (30), wherein the relative terminal velocity of the particles to be treated (45) and the host particles (30) is such that there is little or substantially no migration of the host particles to the outlet (10), and wherein substantially all of the particles of the material to be treated migrate downstream through the circulating host particles to the outlet (10). The process may be used to treat sulphide ores, for flash devolitization, calcination and gasification.

26 Claims, 3 Drawing Sheets

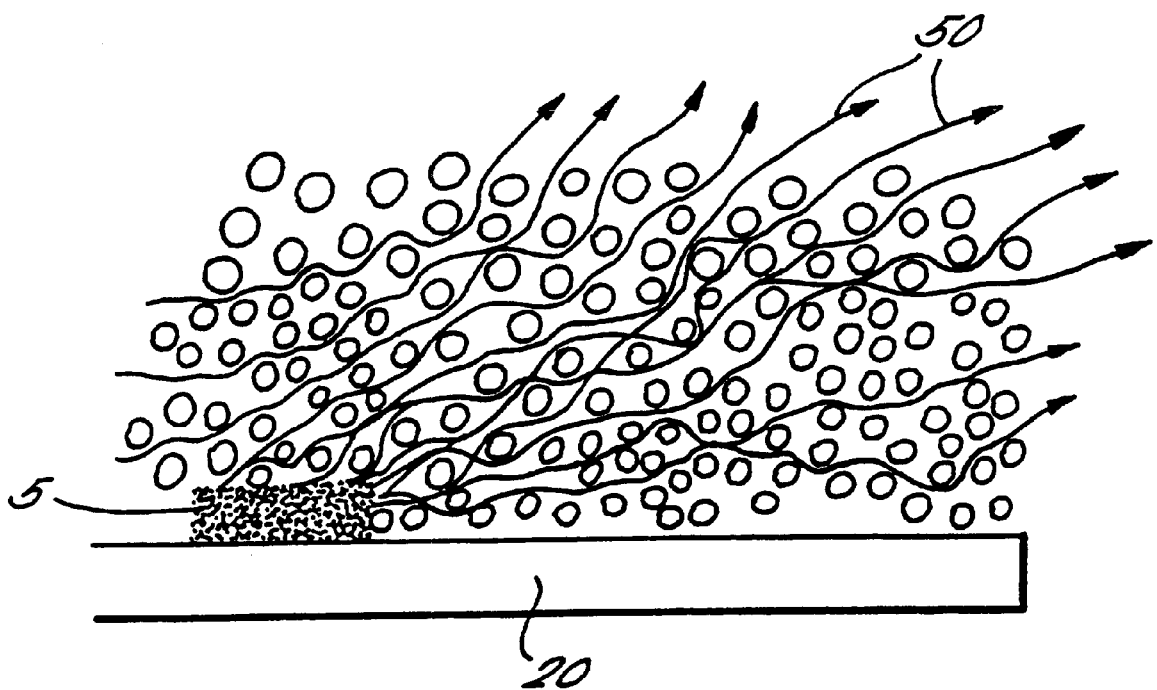

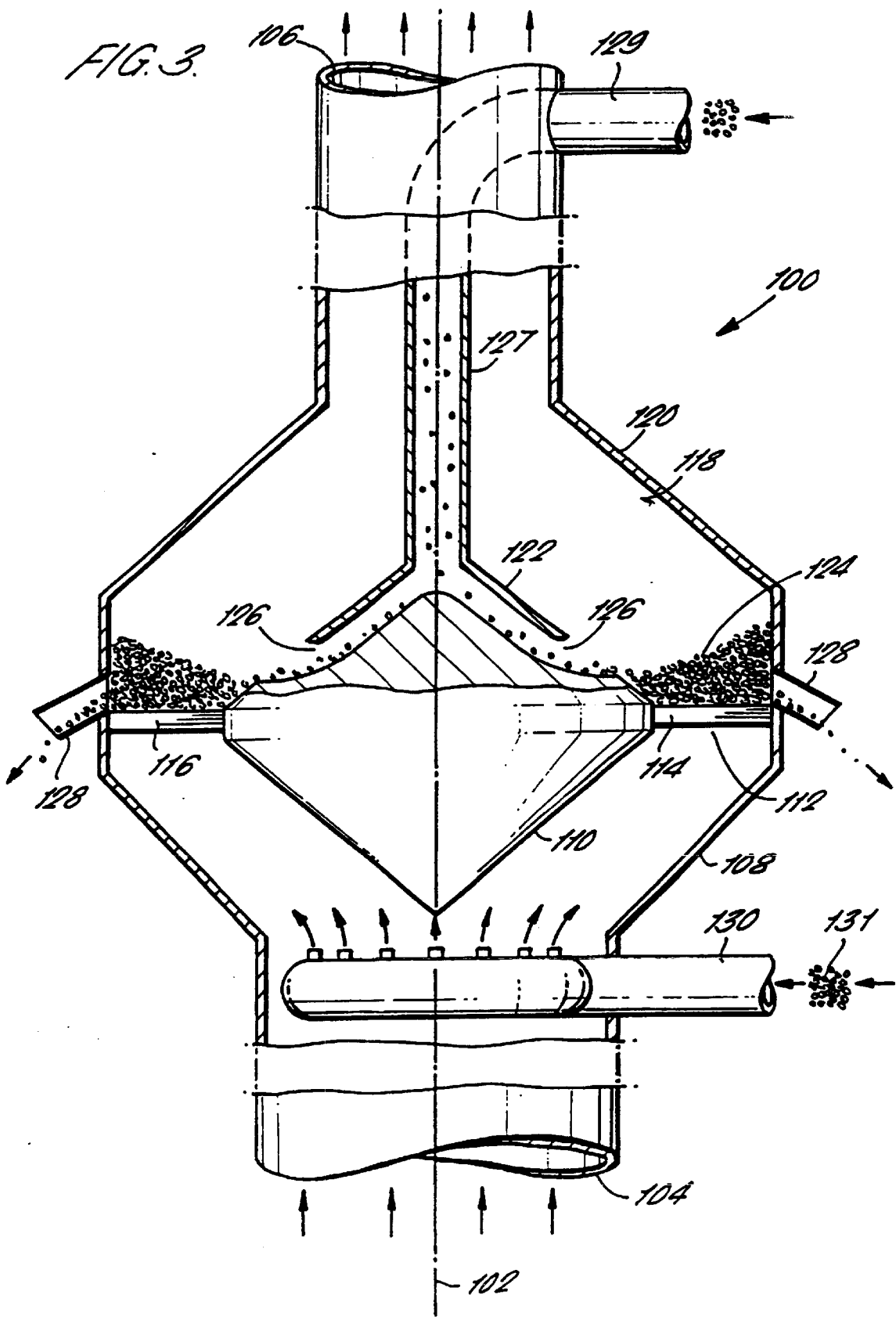

PROCESS AND APPARATUS FOR TREATING PARTICULATE MATTER

The present invention relates to a process for treating particulate matter, in which particles of the material to be treated interact with a non-static second set of particles. The present invention also relates to a reactor apparatus for performing the said process.

A number of techniques have been developed for processing of refractory ores or chemically bonded substrates and these fall into two main categories: hydrometallurgical techniques, such as pressure oxidation and biological leaching; and pyrometallurgical techniques, such as roasting, pyrolysis and calcination.

Several metals occur naturally as the sulphide, for example galena (PbS), copper pyrites and chalcopyrite ($Cu_2S$ with FeS), pentlandite (NiS with $Cu_2S$ and FeS), and zinc blende and sphalerite (ZnS). The metal is extracted from the ore by a reducing or electrowinning process, but it is common to first convert the sulphide into an oxide in a preliminary roasting process. In such a process, the sulphide ore is powdered and then roasted to the oxide by heating in air at a temperature below the melting point of either the sulphide or oxide. Roasting reactions are often exothermic and the heat released provides much or all of that needed to keep up the temperature during the roast. During roasting, the particles of powder may become stuck together, i.e. sintered, so forming agglomerates. If sintering develops too quickly, then oxygen may fail to reach all of the particles and some sulphide will remain and in extremis a fluidisation process will fail as particles grow excessively. A process of flash roasting in a dilute spouting bed reactor is known in the art (Australian *Engineering and Mining Journal—June* 1993 pp 23). In a flash roaster, hot gases enter a vertical reactor assembly through a narrow throat or venturi which provides a region of high gas velocity. Feed solids are then introduced into the gas stream directly above the venturi, which due to the high gas velocity in the throat prevents weeping of the solids. For large particles the reactor behaves as a back-mixed reactor, whilst fine particles are elutriated directly, and hence the behaviour is more plug flow, that is there is essentially little or no mixing or diffusion of the particles along the flow path.

There are a number of disadvantages associated with systems based on the dilute spouting bed technique. Thermal profiles can be generated across the reactor and between the gas phase spout and the surrounding dense bed leading to poor temperature control resulting in unprocessed material and/or agglomeration or possible sealing over the outer surfaces of the reactant particles reducing access to the particle interior. It is also often difficult to control the temperature in the event of an exotherm. Furthermore, as a result of the bi-modal characteristics of the technique, there is a wide distribution of particle residence times. The residence time is furthermore strongly dependent on the material to be treated. This system is also unable to cater for very finely divided feed stocks, or feed stocks with large exotherms.

Further the use of fluidised beds is common whereby the mineral concentrate is introduced, often as a wet filter cake, directly into the fluidised bed with similar disadvantages.

Other hydrometallurgical processes include the pyrolysis of organic metal salts such as cobalt oxalate, which may also contain bonded water of crystallisation, to produce the metal.

In our European Patent No. 0 0068 853 is described and claimed a process whereby particulate material to be treated is embedded and centrifugally retained within a compact, but turbulent, toroidal bed of further particles within the bed and which circulate about the axis of the processing chamber. Specifically, the resident ("host") particles within the bed are circulated above a plurality of outwardly, radiating, inclined vanes arranged around the base of the processing chamber. Said vanes are preferably arranged in overlapping relationship and the particles are caused to circulate around the bed by the action of a processing fluid, for example gas injected into the processing chamber from beneath and through the vanes.

It has now been found in accordance with the present invention that by selection of a differential terminal velocity between the particles of material within the bed, the rate of circulation of the treated material through the bed may be varied according to the nature of the material to be treated and the desired reaction to be achieved. Surprisingly, complete reaction may be achieved in a matter of milliseconds as compared with the prior art processes which required residence times of a second to several minutes. By "terminal velocity" is meant the rate at which a particle, under conditions within the processing chamber, will fall towards the vanes forming the base of the chamber.

Accordingly, in a first aspect the present invention provides a process for treating a particulate material, in which particles of the material to be treated interact with non-static particles of a second material, the process comprising the steps of:
(i) providing a processing chamber having an inlet and an outlet spaced downstream therefrom, the base of said chamber comprising a plurality of outwardly is radiating inclined vanes,
(ii) providing a bed of host particles in the chamber and generating a flow of fluid through the vanes at the base of the processing chamber such that the bed of host particles circulates about an axis of the chamber in a compact turbulent band,
(iii) injecting particles of the material to be treated through an inlet into the chamber to contact with the circulating bed of the host particles,
wherein the relative terminal velocity of the particles to be treated and of the host particles is such that there is little or substantially no migration of the host particles to the outlet, and wherein substantially all of the particles of the material to be treated migrate downstream through the circulating host particles to the outlet.

The flow of fluid may be generated either before or after the host bed of particles is introduced into the chamber. Alternatively, the flow of fluid may be generated as the host bed of particles is introduced into the chamber.

The terminal velocity of the particles will depend upon several parameters, in particular upon density and particle size. In general the average terminal velocity of a host bed particle will be greater than the average terminal velocity of a particle of the material to be treated, prior to the latter being introduced in the chamber. However, the process of the present invention may also be used in circumstances where the terminal velocity of the particles of the material to be treated decreases during processing. In addition, the relative particle size of the material to be treated may be smaller than that of the host particles either initially or resulting from processing through the processing chamber.

Advantageously, the circulating bed of host particles define tortuous paths along which the particles of the material to be treated travel before exiting the processing chamber through the outlet. In an embodiment of the process of the invention the host particles may be withdrawn from the processing chamber from time to time and be replenished with fresh material. Similarly where the host particles are themselves reactive, for example by absorption of released gases from the particles being treated, such host particles may be replenished from time to time.

The particles of the material to be treated preferably enter the chamber below and/or adjacent to the circulating host bed particles in order to contact therewith.

The particles of the material to be treated may be injected into the chamber by conventional means, for example by the use of a compressed fluid, such as compressed air, oxygen, chlorine, ozone, hydrogen, carbon monoxide, sulphur dioxide, hydrogen sulphide, methane, inert gases such as nitrogen, CFC and other noble/-mono-atomic gases.

Heating means are advantageously provided for heating the fluid, such as gas streams produced by the direct combustion of fuels including in-situ combustion of fuels within the bed and indirect heating, for example electrical and microwave. In this case, it will be appreciated that heat transfer may occur between the fluid and the host bed particles and the particles of the material to be treated. Heat transfer will generally also occur between the host bed particles and the particles of the material to be treated.

Separate heating means may also be provided for heating the processing chamber.

An exhaust flow of the fluid may be generated through the outlet of the processing chamber, whereby processed matter is carried in the exhaust flow for withdrawal from the processing chamber to, for example, a cyclone. It will be appreciated that the outlet is vertically spaced above the inlet of the processing chamber.

The host bed of particles typically have an average size of from about 1 to about 6 mm, more typically from about 2 to about 3 mm.

The particles of the material to be treated will generally have an average size of less than about 1000 $\mu$m, preferably less than about 600 $\mu$m and typically fall in the range of from about 50 to about 600 $\mu$m, more typically less than about 300 $\mu$m. The process may also be used to treat very fine feedstocks having an average size in the range of from about 1 to about 500 $\mu$m, preferably less than about 100 $\mu$m, more preferably less than about 50 $\mu$m, more preferably less than about 5 $\mu$m, still more preferably less than about 1 $\mu$m.

The host bed particles may comprise an inert material which does not react with the particles of the material to be treated, such as ceramics, alumina, silica, limestone, and zeolites or, alternatively, may be a material which acts as a catalyst for the reaction of the particles to be treated, such as polyvalent metal salts or activated carbon and in the latter case arrangements must be made to replenish the host bed.

The process of the present invention is particularly suitable for the treatment of sulphide ores, such as, for example, PbS, $Cu_2S$, FeS, NiS and ZnS. In this case, the host bed may comprise particles of a material which is capable of absorbing sulphurous oxides e.g. limestone, quicklime, alumina, sodium based/bearing materials, molecular sieves and silica gel.

The processing chamber may be heated depending on the material to be treated. The host particles may be heated to a temperature in the range of from about 150 to about 1800° C., typically from about 150 to about 1400° C., more typically from about 300 to about 1200° C., still more typically from about 800 to 1200° C. Some types of reaction, for example loss of water of crystallisation and solvent removal, may occur at the lower end of the temperature range.

The particles of the material to be treated typically spend on average from about 1 to about 2000 ms in the circulating host bed of particles, preferably from about 5 to about 2000 ms, more preferably from about 5 to about 1000 ms, more preferably from about 5 to about 50 ms, still more preferably from about 10 to about 50 ms.

The flow of fluid through the chamber may be generated in a manner as described in EP-B-0 382 769 and EP-B-0 068 853, i.e. by supplying a flow of fluid into and through the processing chamber and directing the flow by means of the plurality of outwardly is radiating and preferably overlapping vanes arranged in the form of a disc and located in the processing chamber at or adjacent the base thereof. The vanes are inclined relative to the base of the chamber so as to impart rotational motion to the fluid entering the chamber, hence causing the fluid to circulate about a substantially vertical axis of the chamber as it rises.

The particles of the material to be treated will generally enter the chamber below and/or adjacent to the circulating resident bed particles in order to contact therewith. Alternatively, if the inlet is vertically spaced above the vanes at the base of the chamber and the circulating resident bed, then the particles of the material to be treated will fall down through the chamber, under the action of gravity, on to the circulating resident bed. This may be achieved by, for example, a gravity feed mechanism provided in a vertical wall of the chamber.

In a second aspect the present invention provides a reactor suitable for use in the process according to the present invention.

The reactor depends on a stream of fluid which is directed through a chamber containing a set of host particles which are made to circulate about a vertical axis as an annular bed. The host particles are proportioned to remain resident in the chamber as the fluid flows through the chamber. This arrangement permits the reactor to be used in a variety of processes. Firstly, by entraining feed material in particulate form in the stream of fluid, the feed material can be made to pass through the host particles where there is a very fast inter-reaction which may be chemical or thermodynamic, or a combination of both.

In a preferred embodiment of the reactor, the reactor also provides for replacement of the host particles. To do this the reactor includes at least one inlet and one outlet adjacent the set of host material so that fresh host particles may be fed into the bed as spent host particles leave through the outlet sufficient to maintain the function of the bed of host particles.

The reactor makes it possible to use a variety of host particles for different purposes and also to treat the particles themselves. For instance, the feed material may be subjected to a chemical process at an elevated temperature created by using a heated fluid stream. This process could be exothermic or endothermic. The host particles would then be an inert material which is fed through the chamber continuously and treated externally to maintain a steady temperature in the chamber.

In another use of the reactor, the host particles would be chemically active in the process and require replacement. This can be achieved continuously or intermittently as desired.

Still another use would be in the regeneration of catalyst materials. These materials would be in place as host material and exposed to the fluid stream with or without feed material to treat the catalyst material which can be fed through the chamber for regeneration.

Other processes can be conducted in the reactor limited only by the need for the host particles to remain in an annular bed in the chamber.

Accordingly, in the second aspect of the present invention there is provided in a first embodiment a reactor for exposing host particles to a fluid, the reactor having:

an annular chamber disposed about a vertical axis;

an annulus of fluid inlets at the bottom of the chamber and arranged to direct fluid upwardly in a swirling action to generate flow upwardly and about said axis;

a fluid supply coupled to the inlets to provide fluid to the chamber through the inlets;

a fluid outlet at the top of the chamber to divert spent fluid from the chamber;

a second inlet for directing host particles into the chamber to become resident in an annular bed above the fluid inlets so that fluid and host particles will travel about said axis to expose the host particles to the fluid;

a second outlet for directing host particles out of the chamber as they are replaced by host particles entering through the second inlet; and whereby the reactor receives a supply of host particles sufficient to maintain interaction with the fluid.

In this embodiment the reactor preferably further includes a supply structure in the fluid inlet, the supply structure being arranged to provide feed material in particulate form of a type capable of entrainment in the supply of fluid so that the feed material is carried into the chamber, interacts with the host particles and leaves with the fluid through the fluid outlet.

In a second embodiment, there is provided a reactor for treating feed material in a fluid, the reactor having:

an annular chamber disposed about a vertical axis;

an annulus of fluid inlets at the bottom of the chamber and arranged to direct fluid upwardly in a swirling action to generate flow upwardly and about said axis;

a fluid supply coupled to the inlets to provide fluid to the chamber through the inlets;

a fluid outlet at the top of the chamber to divert spent fluid from the chamber;

a supply structure in the fluid inlet and arranged to provide feed material in particulate form of a type capable of entrainment in the supply of fluid so that the feed material is carried into the chamber to interact with the fluid in an annular bed in the chamber before being carried by the fluid through the outlet.

In the second embodiment the reactor preferably further includes:

a second inlet for directing host particles into the chamber to become resident in an annular bed above the fluid inlets so that feed material and host particles will travel about said axis to expose the host particles to the feed material;

a second outlet for directing host particles out of the chamber; and whereby the apparatus receives a supply of host particles sufficient to maintain interaction between the host particles and the feed material.

The process and apparatus according to the present invention will now be described further, by way of example, with reference to the accompanying drawings, in which:

FIG. 2 is a schematic illustration of the trajectories of particles of material to be treated through a circulating bed of host particles; and FIG. 3 is a schematic illustration of a preferred embodiment of a reactor according to the present invention and shown in partial section on a central axis of the reactor.

Figure 1:
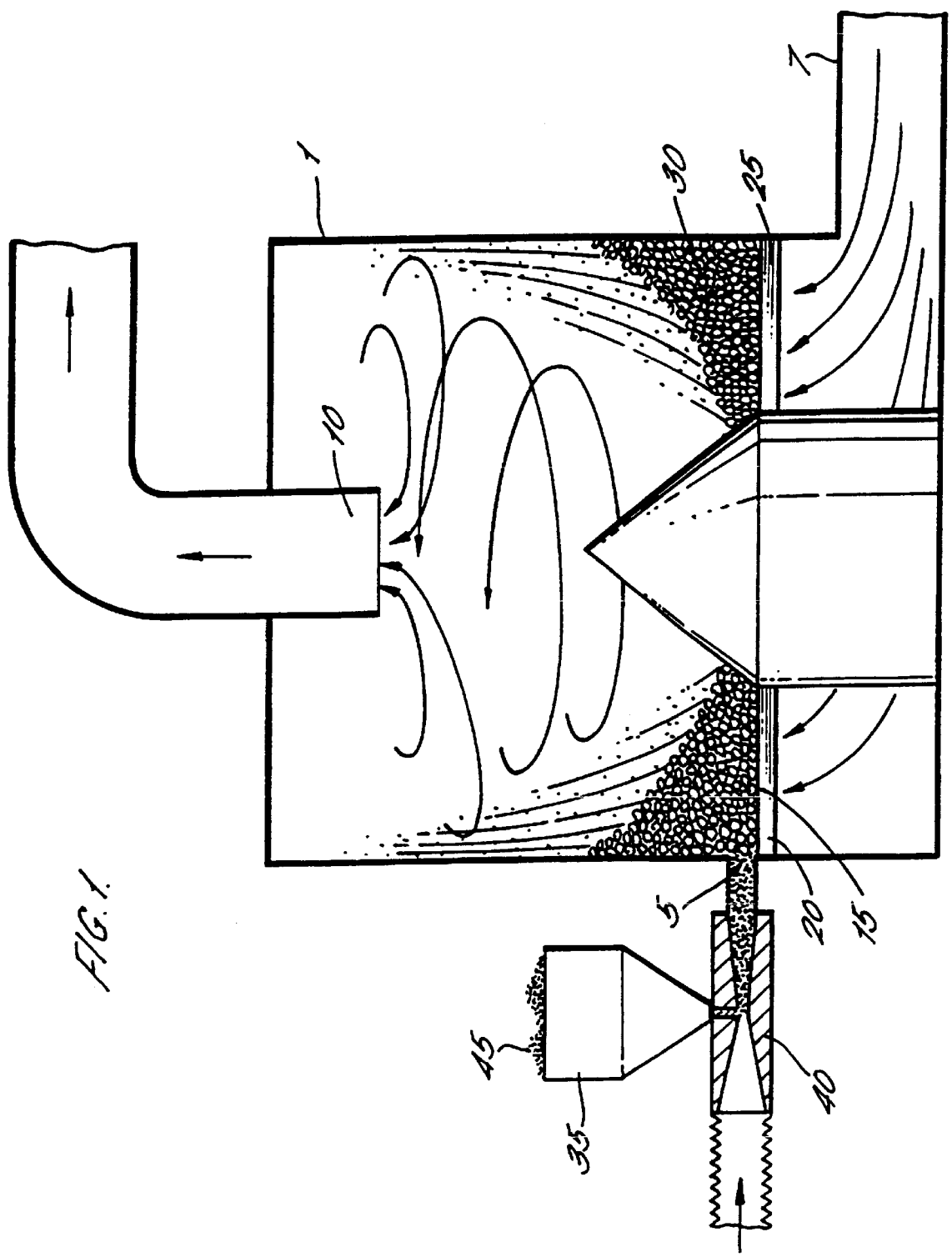
FIG. 1 is a schematic illustration of an apparatus suitable for carrying out the process of the invention.

In FIG. 1, a processing chamber 1 is shown suitable for carrying out the process according to the present invention. The processing chamber 1 has an inlet 5 and an outlet 10 spaced downstream therefrom. At the base 15 of the chamber 1 there is provided a plurality of outwardly radiating vanes, inclined relative to the base 15, two of which are shown at 20 and 25. The vanes 20,25 form part of a circular disc and are preferably arranged in an overlapping arrangement. A flow of fluid, for example heated air, enters the chamber via an inlet 7 and passes through the vanes 20,25 at the base 15 of the chamber 1. The vanes 20,25 impart rotational motion to the fluid entering the chamber 1 so that the fluid circulates about an axis of the chamber 1 as it rises. By this process, the fluid swirls around the chamber 1 in a turbulent fashion and then exhausts from the chamber via the outlet 10. A bed of host particles 30 resides in the chamber 1. A feed hopper 35 and venturi arrangement 40 are provided to supply particles of a material to be treated 45, under compressed air injection, through the inlet 5 into the chamber 1. As the flow of fluid is generated through the vanes 20,25 at the base 15 of the chamber 1, the bed of host particles 30 circulates about a substantially vertical axis of the chamber 1 in an annular region thereof. The particles of the material to be treated 45 are then injected into the chamber 1 and contact immediately or almost immediately with the circulating bed of host particles 30. The relative terminal velocity of the particles to be treated 45 and of the host particles 30 means that there is little or substantially no migration of the host particles 30 to the outlet 10, whilst substantially all of the particles of the material to be treated 45 migrate downstream, through the circulating host particles 30, to the outlet 10. As the exhaust flow of fluid passes through the outlet 10 of the chamber 1, the thus processed matter is carried in the exhaust flow for withdrawal from the chamber 1 to, for example, a cyclone (not shown).

In FIG. 2 trajectories 50 of particles of the material to be treated 45 are shown. It can be seen that the circulating host bed 30 provides tortuous/labyrinthine paths through the reaction zone along which the particles of the material to be treated 45 have to pass before exiting the chamber 1 through the outlet 10.

As seen in FIG. 3, apparatus, designated generally by the numeral 100, is shown extending vertically about an axis 102 and having a bottom fluid inlet 104 and top fluid outlet 106. The fluid, which is commonly a gas, but could also be a liquid in the vapour phase, passes upwardly guided by a conical outer wall 108 and a central deflector 110. The resulting annular flow of gas meets an annulus 112 of blades (two of which are indicated at 114, 116).

These blades are inclined to the horizontal and arranged close to one another to cause the fluid to leave the blades in a direction which has a strong horizontal component to create a swirling action about the axis 102 within a processing chamber 118. The fluid rises in the chamber 118 while maintaining the swirling action and guided by a conical wall 120 and a second central deflector 122 before leaving through the top outlet 106.

As a result of the arrangement of the reactor, a fluid stream is created in the processing chamber 118.

FIG. 3 illustrates a structure which can be used for a variety of purposes. In one such use, the chamber 118 contains host particles 124 which are physically such that they will remain in the chamber as the fluid passes through the chamber. The particles 124 are influenced by the fluid to move about the axis 102 as an annular bed and can be replenished (continuously if necessary) by adding particles through particle inlets 126, in the central deflector 122 and fed by a pipe 127 from an external entry pipe 129. The bed is typically greater than 10 mm and less then 100 mm in depth, but could be in the range of 5 mm to 500 mm in depth, preferably from 5 mm to 300 mm.

Particles enter through inlets 126, and leave through outlets 128 while sufficient particles are always maintained in the annular bed. As a result, a continuous stream of fluid can be used to treat the host particles by continuously passing host particles through the chamber such that the residence time is sufficient for the treatment. An example of such a use would be in the regeneration of catalyst materials.

In another use of the reactor, the host particles 124 are inert and used to maintain a temperature in the chamber 118. Typically in such a process particles 131 are fed from a suitable inlet structure 130 (shown diagrammatically) into the fluid stream. The particles are of a type which will be entrained in the fluid and carried into the chamber 118. Here the particles meet and interact with the bed of host particles which in this case are used to maintain an acceptable temperature range in the reactor. For instance, if the process affecting the particles 131 is exothermic, the particles 124 would be fed through the chamber, cooled and returned. In endothermic reactions, heat could be added by the particles 124.

In other processes there may be inter-reaction between the feed particles and the host particles with or without the need to use the host particles to add/remove heat. In all such cases replenishment of the host particles would be advantageous.

Variations to the apparatus herein described are possible because if the apparatus is to be specific for a -given process or technique, it may not be necessary to replenish the host material or to use the particulate inlet structures. Of course it may also be beneficial in some cases to use both simultaneously.

The circulating bed of host particles provides a highly turbulent environment within which gas/particle heat and mass transfer properties are enhanced. The process consequently enhances heat and/or mass transfer to or from the particles of the material to be treated. A tortuous yet plug flow type path is provided through which the particles travel, which increases their effective residence time in the processing chamber. There is also a high heat transfer to and from the circulating host bed which acts as a heat sink. The enhanced conduction and convection conditions result in an improvement in heat transfer. Each particle to be treated has a substantially uniform retention time in the host bed thus allowing precise process conditions as compared with the random back-mixing and circulation encountered in spouting and fluidised beds.

In the case of sulphide ore particles, such conditions help overcome the problems associated with low softening point eutectic phases, for example in the case of nickel sulphide, which can lead to agglomeration in the bed or processing chamber. In addition, a more rapid oxidation of the sulphide constituents to sulphur dioxide can create more extensive fissures in the particle structure, which enhances the rate and completeness of the sulphide oxidation and produces a product with a very high specific surface area. Specific surface areas typically in the range of from 1 to 10 $m^2/g$ can be obtained, more typically from 4 to 7 $m^2/g$. A high specific surface area product gives a better extraction rate and an improved yield performance in subsequent processing.

In the process of the present invention particles of the material to be treated may undergo a reducing reaction. For example, the particles may be passed through a circulating host bed of carbon suspended in a non-oxidising process fluid stream. This is beneficial because it obviates a further pelletising step heretofore required.

The circulating host bed provides tortuous/labyrinthine paths through the reaction zone along which the particles of the material to be treated have to pass with minimal back mixing. This system, demonstrating substantially plug flow characteristics, enables a more uniform distribution of treatment times to be achieved. Furthermore, in contrast to the prior art techniques, the residence time is less sensitive to particle characteristics. Residence times may also be controlled by the flow rate of fluid through bed of particles, by the physical nature of the host particles, the terminal velocity of the feed of particles to be treated, the mode by which the particles to be treated are introduced into the bed of host particles and the geometry of the processing chamber.

The process of the present invention can be used to treat sulphide ores having a high sulphide content. At present, if the physical/chemical composition of the ore is not conducive to processing in existing thermal processing units, the ore often needs to be processed hydrometallurgically which results in higher processing costs and is detrimental to the environment.

The process can be used with very fine feedstocks, like those produced from beneficiation circuits and also allows high sulphide ores to be processed. For some materials, the creation of more extensive fissures during roasting may produce a calcine with a much higher specific surface area than previously obtained.

Fine control over particle residence times can be achieved and a higher heat and mass transfer environment obtained, hence reducing the roasting period compared with other techniques.

The process according to the present invention may be used in the following technical fields.

(a) The flash devolatilisation and oxidation of, for example, PAHs from harbour sediment and zinc, lead and other volatile metals within dross and concentrate.

(b) Roasting of sulphide ores or concentrates, for example, precious group metals, base metals and complex or dirty ore bodies.

(c) Calcination of, for example, kaolin to remove combined water and to exfoliate or expand the particles, gypsum to form an anhydrite, leach residues to dissociate ferrites, talc to produce Cristoballite.

(d) Combustion of carbon in fly ash from coal fired power stations.

(e) Pyrohydrolysis of, for example, magnesium chloride, nickel chloride and aluminium chloride.

(f) Flash reduction of, for example, oxides, such as manganese dioxide.

(g) Gasification and pyrolysis.

(h) Reactions where the resident bed takes part in a chemical reaction or acts as a catalyst.

(i) Heat recovery from or cooling or heating of fine particulate matter.

(j) Fine particles grown by accretion or agglomeration.

The following advantages can be achieved by the process according to the present invention.

1. Higher Terminal Velocities Through the Reactor

The velocity of the process gas stream (air in most cases) through the reactor in the process as herein described can be higher than a fluidized bed for roasting of, for example, sulphide concentrates. By necessity, concentrates consist of fine particles to achieve the surface area for subsequent acid leaching. Typically the particle sizes range from 10 to 150 $\mu m$ with a trend towards the finer end. In order to be able to hold the particles in a conventional fluid bed roaster without immediate elutriation on entry, the feed to the roaster has water added to form a weak agglomerate with a larger particle size. The agglomerate reduces in size as the concentrate is roasted due to attrition, thermal shock and other forces breaking up the agglomerate. The roasted product is mostly collected from the exhaust gases by cyclone and electrostatic precipitation, although some larger agglomerates are discharged directly from the bed. The throughput of air through a fluid bed roaster has to be such that the larger agglomerates are fluidized, but without premature elutriation of the finer fractions before they have been roasted. In a typical commercial fluid bed roaster for ZnS concentrate, for example, the superficial velocity of the process gas stream leaving the bed is typically in the range of from 0.5 to 2.0 m/s, more typically from 0.7 to 1.0 m/s in order to achieve the optimal throughput combined with roast performance. In the process according to the present invention the roasting reaction between the sulphide concentrate and air is sufficiently fast so that the reaction is sufficiently complete within the time period the concentrate is passing through the resident bed. Thus the velocity of the process gas stream that can be passed through the resident bed and hence the whole reactor is only limited by the terminal velocity of the resident bed particles. Thus by selecting a denser particle bed, it is possible to achieve superficial velocities in the area directly above the bed typically in the range of from 5 to 15 m/s, more typically from 6.5 to 9.0 m/s. The increase in the process gas mass flow over an existing fluid bed roaster allows for reactors to be less than half the diameter of existing roasters for an equivalent process gas input rate. The size and cost of reactors for roasting can thus be at lower capital cost.

2. The Calcine or Roasted Material has a Higher Particle Specific Surface Area

The particle morphology produced by the process according to the present invention tends to be more fissured, porous, bloated and/or exploded compared with conventional particle morphologies. This results in a higher specific surface area and/or lower loose bulk density. In the roasting of, for example, sulphide concentrates, the specific surface area of the roasted particles has been demonstrated to be between 5 and 15 times greater than material roasted in existing commercial fluid beds operating at similar roast temperatures. The surface area of particles roasted at the same temperature in a conventional fluidized bed and using the process according to the present invention have been compared. A specific surface area (measured by BET) increase for roasted ZnS from 0.65 $m^2/g$ to 4.75 $m^2/g$ has been observed at a roast temperature of from 900 to 950° C. The higher specific surface area of the particles is beneficial in improving the leaching of metals from the concentrate. Roasted materials produced according to the present invention are more amenable to leaching in weaker or neutral leaching conditions and recoveries of metals as high as 99% can be achieved. This was formerly only possible by employing a strong acid or alkali leash stage at a high temperature. The residual sulphur in the roasted calcine as sulphide can be significantly higher (by a factor of 2) than is possible with conventional sulphide roasts without the metal recovery being adversely affected. This is thought to be a result of the increased availability of sites within the particles providing more effective leaching.

3. The Flow Pattern of the Particles is Substantially Plug Flow

In a conventional fluid bed roaster, the retention time of any one particle can vary widely between seconds and a few minutes depending upon the agglomerate size on entry to the roaster. Additionally, the process gas quality (% $SO_2$, $O_2$, $N_2$, $H_2O$) generally varies throughout the mass of a fluid bed charge and the process conditions are far from uniform for every particle in a typical fluid bed. In the present invention, each particle is exposed to substantially identical process conditions with a substantially uniform retention time (albeit relatively short), temperature and process gas composition. The ability to closely control these parameters, particularly temperature, allows, for example, a precision sulphation roast of some concentrates whereby the roast achieves conversion of the sulphide to a sulphate; not total oxidation to an oxide as is generally carried out.

4. Bypass an Accretion Critical Temperature

In talc calcination to produce Cristobalite, talc is calcined to 1100° C. to carry out the crystal transformation. An intermediate phase is formed at around 600° C. whereby the mineral becomes sticky and agglomerates without control. This process is difficult if not impossible to carry out in a rotary kiln or fluid bed. The process according to the present invention, however, can be used to flash calcine talc (at, for example, a particle size of 100%<5 $\mu$m) with a retention time typically in the range of from 15 and 20 ms, hence substantially bypassing the formation of the sticky phase. Many complex mineral ores have such constituents as to cause eutectic phases during roasting or calcination. The ability of the process as herein described to flash through these eutectic phases is a significant advantage over the prior art processes.

5. Lower Air Pressure Drop

The pressure drop across a reactor as herein described is typically in the range of from 100 to 150 mm WG. At these low levels recirculation of the process gas stream is facilitated particularly at high temperatures (greater than about 1000° C.). This is particularly relevant where flash reduction processes are to carried out where the reactant gas ($CO, H_2$, $CH_4$ etc) is either a hazardous substance or costly to produce. The low gas pressure drop through, for example, a zinc roaster according to the present invention can reduce electricity consumption in the main air blowers by more than 50% compared with a conventional fluid bed roaster.

6. No Moisture Addition to Agglomerate Particles

In most applications of fluid bed roasters, water is used to agglomerate the feed concentrate to an acceptable size. The water also acts as a coolant but must be cooled and re-condensed in the downstream hot gas handling systems. In contrast, the process according to the present invention does not require the addition of water to the feed and thus the heat recovery can be facilitated by circulating the resident bed with a cooler external to the roaster. By this means temperature control of the roasting process can be achieved without using water, and heat can be recovered without dust and $SO_2$ being present. Furthermore, any down-stream acid recovery plants do not need cooling or water removal from the exhaust gases.

7. Ability to Flash Combust or Oxidise Fine Particles

The process according to the present invention has been used to remove PAHs and cyanide from lake sediment generally having a mean particle size of approximately 16 $\mu$m. Concentrations of PAH at 5000 ppm to below detectable levels within a retention time of between 10 and 100 ms have been achieved.

What is claimed is:

1. A process for treating a particulate material, in which particles of the material to be treated contact a host bed of particles, the process comprising the steps of:

(i) providing a processing chamber having an inlet and an outlet spaced downstream therefrom, the base of said chamber comprising a plurality of outwardly radiating inclined vanes, (ii) providing the host bed of particles in the chamber and generating a flow of fluid through the vanes at the base of the processing chamber such that the bed of host particles circulates about an axis of the chamber in a compact band, (iii) injecting particles of the material to be treated through an inlet of the chamber to contact with the circulating bed of the host particles, wherein the particles of the material to be treated are carried into the chamber with said flow of fluid, wherein the relative terminal velocity of the particles to be treated and the host particles is such that there is substantially no migration of the host particles to the outlet, and wherein substantially all of the particles of the material to be treated migrate downstream through the circulating host particles to the outlet; and wherein the particles of the material to be treated spend on average from 1 to 1000 ms in the circulating host bed particles.

2. A process as claimed in claim 1, wherein the average terminal velocity of a host bed particle is greater than the average terminal velocity of a particle of the material to be treated.

3. A process as claimed in claim 1, wherein the particle sieve size of the particles to be treated is less than the particle size of the host bed particles.

4. A process as claimed in claim 1, wherein the host bed particles have an average sieve size of from 1 to 6 mm.

5. A process as claimed in claim 4, wherein the host bed particles have an average sieve size of from 2 to 3 mm.

6. A process as claimed in claim 1, wherein the particles of the material to be treated have an average size of less than 600 μm.

7. A process as claimed in claim 6, wherein the particles of the material to be treated have an average size of less than 100 μm.

8. A process as claimed in claim 7, wherein the particles of the material to be treated have an average size of less than 10 μm.

9. A process as claimed in claim 1, wherein the host bed particles circulate around an annular region in the processing chamber.

10. A process as claimed in claim 1, wherein the host bed particles are removed from and subsequently recycled to the processing chamber.

11. A process as claimed in claim 1, wherein the fluid comprises air.

12. A process as claimed in claim 1, wherein heating means are provided for heating the fluid.

13. A process as claimed in claim 1, wherein there is heat transfer between the fluid and the host bed particles and the particles of the material to be treated and/or heat transfer between the host bed particles and the particles of the material to be treated.

14. A process as claimed in claim 1, wherein an exhaust flow of the fluid is generated through the outlet of the processing chamber, whereby processed matter is carried in the exhaust flow for withdrawal from the processing chamber.

15. A process as claimed in claim 1, wherein the host bed particles comprise an inert material which does not react with the particles of the material to be treated.

16. A process as claimed in claim 1, wherein the host bed particles are selected from the group consisting of alumina, limestone, activated carbon, a zeolite and mixtures thereof.

17. A process as claimed in claim 1, wherein the particles of the material to be treated are selected from the group consisting of a sulphide ore, kaolin, gypsum, talc, magnesium chloride, nickel chloride, aluminum chloride, manganese oxide, precious group metals, base metals, dirty ore bodies, a volatile metal and mixtures thereof.

18. A process as claimed in claim 17, wherein the sulphide ore is selected from the group consisting of PbS, $Cu_2S$, FeS, NiS and ZnS.

19. A process as claimed in claims 18, wherein the catalyst is selected from the group consisting of polyvalent metal salts, activated carbon and mixtures thereof.

20. A process as claimed in claim 1, wherein the particles of material to be treated comprise organic metal salts and are pyrolysed to produce the metal.

21. A process as claimed in claim 20, wherein the organic metal salts contain bonded water of crystallisation.

22. A process as claimed in claim 1, wherein the host particles comprise a catalyst for the reaction of the particles to be treated.

23. A process as claimed in claim 1, wherein the temperature in the processing chamber is in the range of from 150 to 1800° C.

24. A process as claimed in claim 23, wherein the temperature in the processing chamber is in the range of from 800 to 1200° C.

25. A process as claimed in claim 1, wherein the particles of the material to be treated spend on average from 5 to 50 ms in the circulating host bed particles.

26. A process as claimed in claim 1, wherein the processing chamber comprises:

an annular chamber disposed about a vertical axis;

an annulus of fluid inlets at the bottom of the chamber and arranged to direct fluid upwardly in a swirling action to generate flow upwardly and about said axis;

a fluid supply coupled to the inlets to provide fluid to the chamber through the inlets;

a fluid outlet at the top of the chamber to divert spent fluid from the chamber;

a supply structure in the fluid inlet, the supply structure being arranged to provide particles of the material to be treated in the supply of fluid so that the particles of the material to be treated are carried into the chamber, interact with the host particles and leave with the fluid through the fluid outlet;

a second inlet for directing host particles into the chamber to become resident in an annular bed above the fluid inlets so that fluid and host particles will travel about said axis to expose the host particles to the fluid;

a second outlet for directing host particles out of the chamber as they are replaced by host particles entering through the second inlet; and whereby the reactor receives a supply of host particles sufficient to maintain interaction with the fluid.

* * * * *